United States Patent [19]
Kitamura et al.

[11] Patent Number: 5,825,920
[45] Date of Patent: Oct. 20, 1998

[54] METHOD AND UNIT FOR BINARY PROCESSING IN IMAGE PROCESSING UNIT AND METHOD AND UNIT FOR RECOGNIZING CHARACTERS

[75] Inventors: Tadaaki Kitamura, Hitachi; Masao Takatoo, Katsuta; Norio Tanaka, Hitachi, all of Japan

[73] Assignee: Hitachi, Ltd., Tokyo, Japan

[21] Appl. No.: 995,760

[22] Filed: Dec. 22, 1992

Related U.S. Application Data

[62] Division of Ser. No. 646,388, Jan. 28, 1991, Pat. No. 5,243,668.

[51] Int. Cl.⁶ ........................................... G06K 9/34
[52] U.S. Cl. ........................................... 382/178; 382/290
[58] Field of Search .................................. 382/46, 9, 18, 382/10, 177, 178, 174, 289, 290, 295; 358/453; 395/117

[56] References Cited

U.S. PATENT DOCUMENTS

| 4,658,428 | 4/1987 | Bedros et al. | 382/46 |
| 5,001,766 | 3/1991 | Baird | 382/46 |
| 5,093,653 | 3/1992 | Ikehira | 382/46 |
| 5,138,668 | 8/1992 | Abe | 382/9 |

*Primary Examiner*—Joseph Mancuso
*Attorney, Agent, or Firm*—Antonelli, Terry, Stout & Kraus, LLP.

[57] ABSTRACT

A binary processing method for a variable density image the method includes the steps of binary processing an image having variable density, according to which brightness of an image having variable density to be binary processed is given as 1/n (where n is an integer of 2 or above), and expansion processing and smoothening processing the image having the brightness of 1/n so that a threshold value image for binary processing is generated. A difference is obtained between the threshold value image and the variable density image to be binary processed, such that it is possible to carry out binary processing even for an image having a complex background or variance in brightness.

5 Claims, 16 Drawing Sheets

INPUT IMAGE

DENSITY PROFILE OF A-A'

DENSITY PROFILE OF THE DIFFERENTIATED IMAGE

IMAGE HAVING BRIGHTNESS OF 1/2 OF THAT OF FIG. 1c

IMAGE WHICH IS A RESULT OF DEDUCTING FIG. 1f FROM FIG. 1c

IMAGE WHICH HAS BEEN EXPANDED FROM FIG. 1d

IMAGE WHICH IS A RESULT OF SMOOTHERING FIG. 1e

FIG. 2a
PRIOR ART
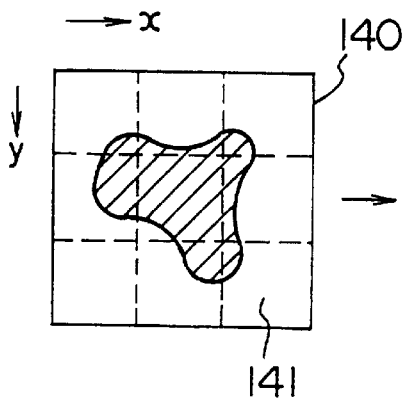
FIG. 2b
PRIOR ART
FIG. 2c
PRIOR ART
FIG. 3
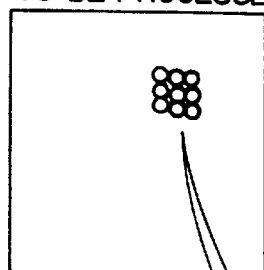
VARIABLE DENSITY IMAGE TO BE PROCESSED
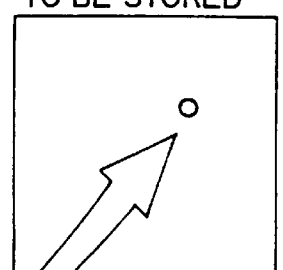
VARIABLE DENSITY IMAGE TO BE STORED
$F = \max(f_i)$

DIFFERENTIATED IMAGE
HAVING NOISE

IMAGE HAVING BRIGHTNESS
OF 1/2 OF THAT OF FIG. 5a

THRESHOLD-VALUE IMAGE

INPUT IMAGE

DENSITY PROFILE OF A—A'

EXPANSION PROCESSING OF FIG. 6b

COMPRESSION PROCESSING OF FIG. 6c

IMAGE OF RESULT OF DEDUCTING FIG. 6b FROM FIG. 6d

PROJECTION PATTERN IN θ DIRECTION

PROJECTION PATTERN IN
VERTICAL DIRECTION $xd(\theta_1), xd(\theta_2), xd(\theta_3)$ APPLIES TO
$xd(\theta) = a\theta^2 + b\theta + c$ CALCULATE $\theta$ AT WHICH $xd(\theta)$ BECOMES A MINIMUM

46 — QUADRATIC CURVE APPLICATION CIRCUIT

47 — MINIMUM VALUE DETECTION CIRCUIT FOR OBTAINING A MINIMUM VALUE OF $xd(\theta)$ $$\begin{cases} x' = x - \tan\theta \cdot y \\ y' = y \end{cases}$$

FIG. 26a
PRIOR ART
FIG. 26b
PRIOR ART
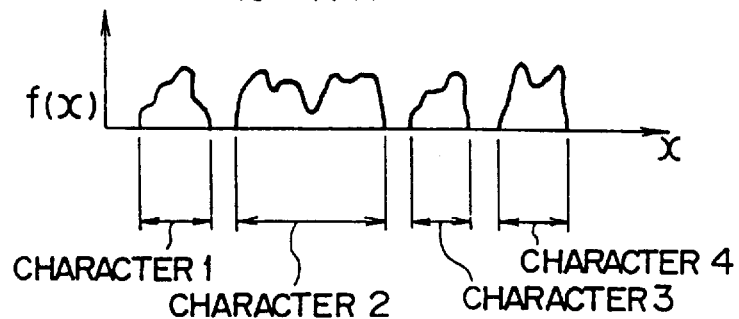
FIG. 27a
PRIOR ART
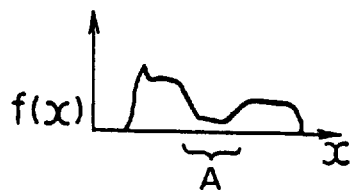
FIG. 27b
PRIOR ART
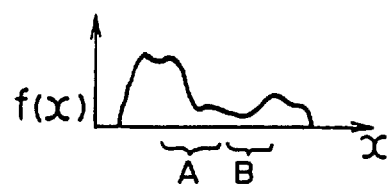

METHOD AND UNIT FOR BINARY PROCESSING IN IMAGE PROCESSING UNIT AND METHOD AND UNIT FOR RECOGNIZING CHARACTERS

This is a divisional of application Ser. No. 646,388, filed Jan. 28, 1991. now U.S. Pat. No. 5,243,668

BACKGROUND OF THE INVENTION

The present invention relates to image processing, and more particularly to a method and a unit for binarizing images having a complex background or uneven brightness. The present invention also relates to a method and a unit for recognizing characters suitable for recognizing distorted characters and for separating each one character from an inputted character string pattern in a character recognition unit which has characters and the like as an input and recognizes the input.

In recognizing characters by using an image processing unit, generally an image data picked up by using a television camera or the like is compressed into binary data of "0" and "1" at a certain threshold value level and then the binary data is processed. For example, characters are expressed in a binary level of "1" and a background is expressed in a binary level of "0", and the data of the "1" level is processed to recognize the characters.

When a relatively clear image is to be recognized such as the case where characters written in the color black on white paper are to be recognized, it is possible to easily determine the above-described threshold value in advance (such as, for example, an average density is set as a threshold value). However, in order to cope with a more complex application, a satisfactory performance cannot be obtained in many cases just by such a simple binary processing as described above. The following are some of the examples of complex applications.

(1) extracting characters from a corrugated card board box having patterns (2) extracting characters from an outdoor billboard (3) extracting characters from a printed substrate From the objects as described above, it is not possible to extract characters by a simple binary processing method because the background of the characters is complex and there are extreme variations in the brightness on the objects. It is therefore necessary to obtain a binary method for satisfactorily extracting characters from such objects as described above. As one of conventional examples of such a method, there has been proposed a binary extracting method in the "An Investigation of a Method of Extracting Characters from a Scenary Image" written by Mr. Ohtani, (lecture theses for the national meeting of the Information Processing Society of Japan; March, 1986).

As shown in FIG. 2a to FIG. 2c, one picture of a variable-density image 140 inputted from a television camera or the like is divided into a plurality of sub-blocks 141, and an optimum binary threshold value level $\theta ij$ is determined in each of the sub-blocks 141 as shown in FIG. 2b. In this case, the threshold value $\theta ij$ is taken as a two-class issue for dividing each image into two classes of white and black within each of the subblocks 141, and the threshold value is the value at which a dispersion between the two classes is a maximum. Further, in order to maintain the continuity between the sub-blocks 141, picture elements are interpolated by using the respective threshold values $\theta ij$ as shown in FIG. 2c. As a result, a threshold value $\theta x, y$ is obtained. In other words, the threshold value $\theta x, y$ for each picture element is determined, thereby to express the input image in binary data.

The above-described conventional technology has problems. In the former case, a density histogram is used to determine the threshold value $\theta ij$ within each sub-block (that is, the frequency of each density level is obtained within each sub-block), and a second order image data is converted to a first order data. Accordingly, no consideration is given to positional information of brightness, so that it is not possible to determine an optimum threshold value by this method.

Further, it takes an extremely long processing time to obtain the $\theta x, y$, making it impossible to extract characters in real time.

when an input image is differentiated, non-edge portions become almost "0" and edged portions become a variable-density image having values corresponding to an intensity of the edges. When such an image is to be expressed in binary values, the above method is not suitable to perform optimum edge extraction.

According to a conventional character recognition unit shown in FIG. 13, when a character string pattern 41 is obtained from an image pick-up unit or the like, each character is separated by a single character separation circuit 42 and each character is recognized by being compared with dictionary data 44 in a recognition circuit 43. In recognizing the characters, when a shape pattern is used as dictionary data a magnitude of proximity between the dictionary data and the character data is obtained. Then, the character data is allocated to a category having the highest magnitude of proximity (which is usually called pattern matching) to obtain the character. Further, when "characteristics" of a number of holes and a number of dots in a character are held as dictionary data, a decision tree of these "characteristics" is followed to recognize the character.

There are methods for recognizing characters in high precision when the character string is slanted as shown in FIG. 15, as disclosed in JP-A-59-66783 and the JP-A-1-156887. According to these methods, projection patterns of a character string in both horizontal and vertical directions are obtained to obtain an approximate slope $\phi$ of the character string. Based on this slope $\phi$, the direction of scanning the character string direction is gradually changed, and the slope $\phi$ of the character string is determined to be the one at which the change of a number of segments obtained (that is, the number of characters contributing to the projection distribution) and a projection value becomes the largest.

As shown in FIG. 15, the slope $\phi$ of the character string obtained by this method corresponds to an angle rotated from the right position when each character is looked at. Thus, the character string coincides with the dictionary pattern when the character string is rotated adversely by the angle $\phi$ to return the character string to the right standing state. An image picked up from a car number plate, however, has a character string pattern 41, for example, as shown in FIG. 14. This character string pattern 41 is the pattern of the character string pattern 41 in FIG. 13 which is looked at from below the left slant angle at which the horizontal direction is not changed and the characters are distorted to decline to the left side. When the magnitude of the distortion is constant, it becomes possible to recognize the characters if there is dictionary data for each distorted character. However, this distortion is different depending on a positional relationship of a camera for picking up the number plate relative to a car. Further, the distortion is also different depending on a position at which the number plate is fitted to the car. Accordingly, the magnitude of distortion is different for each car so that it is impossible to have dictionary data for each of the individual distortions.

Therefore, unless these distorted characters are corrected, it is not possible to accurately recognize characters as the magnitude of proximity in a proximity calculation circuit 43 is low even if pattern matching is tried between a distorted character 44a and a dictionary pattern 44b as shown in FIG. 14. This distortion does not disappear even if the whole character is rotated by the slope angle φ as is done in the prior art, and no accurate recognition of characters can be performed accordingly.

A character recognition unit for recognizing printed characters or stamped characters has functions as shown in FIG. 25. A pattern to be recognized is picked up by a television camera 10 or the like, and an obtained analog signal is quantized into about seven to eight bits by an A/D converter 11. These are changed into binary values by a binary circuit 18 and the result is stored in a frame memory 12. From this recognized pattern stored in the frame memory 12, each one character is separated by a character separation circuit 30 and is compared with a dictionary pattern stored in advance, for example, in a dictionary pattern memory 28, by a recognition circuit 27. A pattern which is most similar to the dictionary pattern is outputted as a result of recognition.

In such a recognition unit as described above, when the quality of characters is poor, characters may be in contact with each other in many cases in the above described binary processing stage. Therefore, in order to separate contacted characters from each other, the character separation circuit 30 is used and a projection pattern (shown in FIG. 26b) is obtained in the direction perpendicular to the line of the character string shown in FIG. 26a. The characters are separated at a position having the least projection pattern and each character is recognized. However, according to this method, erroneous separation of characters occurs frequently and the rate of recognition is extremely low.

Methods disclosed in the JP-A-61-72373 and the JP-A-63-216188 provide an improvement for the prevention of erroneous separation of characters in the above simple processing. However, both of these methods use a projection pattern and therefore, there are still such cases where characters are separated at erroneous positions when the characters are connected as shown in FIGS. 27a and 27b.

Since the projection pattern is for counting a number of picture elements in the vertical direction, it is difficult to determine at what position of "A" the two characters in FIG. 27a are to be separated because the number of picture elements in the vertical direction is all the same at the portion of "A" in the case of FIG. 27a. Further, in the case of FIG. 27b, it is difficult to discriminate between the projection pattern of the "-" (hyphen) (portion "A") and the projection pattern of the upper portion of "7" (portion "B"), so that a position of separating the two characters may be selected wrong. Further, no consideration has been given to the method of solving the case where sizes of characters and distances between characters are different. (Distance between characters is regarded as being constant.)

SUMMARY OF THE INVENTION

It is an object of the present invention to provide a method and a unit for binary processing an image in an image processing unit which can generate a clear binary image at a high speed even if the image has a complex background or variance in the image brightness.

It is another object of the present invention to provide a method and a unit for recognizing characters which can correct distorted characters to enable them to be compared with dictionary data and to be recognized accurately even if such distorted characters are inputted by picking up an image from a slant angle.

It is still another object of the present invention to provide a method and a unit for recognizing characters which can satisfactorily separate characters and recognize individual characters even if an inputted character string includes characters that are in contact with an adjacent character.

The basic processing according to the present invention is a method of expressing an image by using binary data such that a density of areas for other purpose than image differentiation is expressed in "0". Therefore, an object for this processing will be explained first, and a method of expressing a normal image of variable density in binary data will be explained later.

To simplify the explanation of an input image of FIG. 1a, an image of the first order connecting two points A and A,' is shown in FIG. 1b. FIG. 1c shows an image which is the result of differentiating the image of FIG. 1b (absolute values of differentiated values are obtained). A value of approximately "0" value is shown for non-edge portions and density values corresponding to the density of the edges are shown only at the edge portions. When there is a variation in the brightness in this case, intensity of the edges is different depending on the positions. Therefore, it is not possible to satisfactorily extract all the edges even if a certain fixed threshold value has been set. For example, if the threshold value is too high, it is not possible to extract portions having small edge intensity. On the other hand, when the edge intensity is too low, portions having high edge intensity are extracted to be very thick. Therefore, according to the present invention, it is considered that a curve passing through an intermediate density of the areas which are to be extracted is an ideal threshold value, and a unit for generating this surface is provided. The present invention is characterized by the following. Brightness (density) of an image to be expressed in binary data is set as $1/n$, and a peak density value of the image having $1/n$ shows an intermediate value of the density values of the edges (when n is 2). Therefore, an expansion processing is performed to the image having the value $1/n$ and further a smoothing processing is performed to the expanded image so that a threshold-value image is generated. Then, a difference between this threshold value image and the image to be expressed in binary data is obtained, thereby to obtain a satisfactory binary image.

The present invention is further characterized by the following. In the character recognition method for recognizing characters obtained in a picked-up image by using dictionary data, a distortion angle is obtained with respect to a horizontal direction at which widths of characters obtained by picking up an image at a slant angle are observed to be the minimum. At this distortion angle obtained, horizontal direction components for the distorted characters or the dictionary data are corrected so as to recognize the characters. By this arrangement, it becomes possible to recognize characters at a high recognition rate even if those characters are distorted depending on the direction in which the image was picked up. Further, a distortion angle is also obtained with respect to a vertical direction in which heights of the distorted characters are observed as the minimum, and vertical direction components of the distorted characters or dictionary data are connected at this distortion angle so as to recognize the characters. The present invention is also characterized in that it comprises a frame memory for changing into binary values an image pick-up signal obtained by horizontal and vertical scanning a character string to be recognized, dividing the binary values into picture elements and storing the result, an address designation unit for designating the address of the frame memory and reading the data stored in the frame memory by scanning the address of the frame memory data from a predetermined position (to a predetermined direction), a projected pattern extraction unit for extracting a number of picture elements representing (number of the character strings) of the image data read out at every scanning by the address designation unit, a projection width extraction unit for obtaining a number of scanning lines or a width of scanning lines for which the projection value of the projection pattern is not "0", a distortion angle detection unit for scanning the frame memory by gradually changing the direction of the scanning lines and obtaining a distortion angle which is a scanning direction in which the projection width obtained becomes the minimum, a unit for taking out each character data from the character string, a correction unit for correcting only one of the horizontal direction components and the vertical direction components of each character data or the dictionary data corresponding to each character, and a recognition unit for comparing the corrected character data or dictionary data with the non-corrected dictionary data or character data, to perform character recognition. Instead of the binary data, variable density information may be used to extract the cumulative value of the density to recognize characters. Also, instead of obtaining a distortion angle at which the range where characters exist (width of characters) becomes a minimum, it may be desirable to select a distortion angle at which the range where no characters exist becomes a maximum as angle. In consideration of the difference between the so-called "black characters" and the "white characters" when density data is used, the "0" in the above-described "when the density cumulative value is not "0"" means that the density data of the background is "0".

The present invention is further characterized by the following. In separating a character from a character string pattern obtained by picking up an image, a weight distribution is obtained such that a picture element separated from yc takes a larger value around the yc which is the center of the highest point of the character string (y coordinates for the center, x coordinates for the horizontal direction, and y coordinates for the vertical direction) without using a projection pattern. The weight distribution value is compared with a threshold value to separate a character block. For this separated character block, discrimination is made about how many characters are in contact with each other, by using a standard character width. Based on a result of this discrimination or the number of characters in contact, the width of the character block is divided equally, and coordinates of the equally divided pieces of the character block are obtained, and characters are separated at positions of these coordinates. Thus, it becomes possible to perform satisfactory separation of characters in the character string including characters which are in contact with other characters.

BRIEF DESCRIPTION OF THE DRAWINGS

FIGS. 2a to 2c are diagrams for explaining the conventional method for expressing an input image in binary numbers;

FIG. 3 is a diagram for explaining the operation principle of the local maximum value filter in one embodiment of the present invention;

FIGS. 26a and 26b are diagrams for explaining the character separation by using the conventional projection pattern; and FIGS. 27a and 27b are drawings for explaining a problem point in the case where character separation is performed by using the conventional projection pattern.

DESCRIPTION OF THE PREFERRED EMBODIMENTS

Figure 1A:
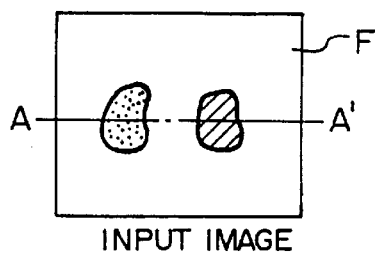
FIGS. 1a to 1g are diagrams for explaining the processing of generating a threshold value image which is one embodiment of the present invention.
Figure 1B:
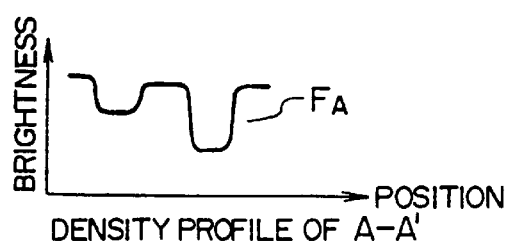
Figure 1C:
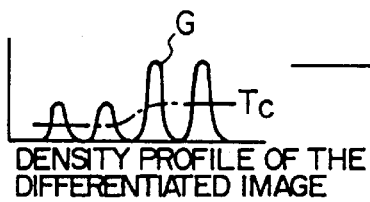

FIGS. 1a to 1g show a processing flow. FIG. 1a shows an input image F, and the information of one line along A—A' in this diagram is expressed as shown by $F_A$ in FIG. 1b in which the lateral axis represents a position and the vertical axis represents brightness (density). This input image is differentiated (of which output is in an absolute value) to obtain an image G in FIG. 1c. In this image, non-edge portions almost take a value of "0" and values corresponding to the intensity of the edges are shown at the edge portions. In generating a binary threshold value for this image, it is ideal to generate a curve Tc which passes through the intermediate density of the intensity (contrast) of each edge. However, since an input image is in fact a second order plane, it is necessary to generate a curved surface instead of a curved line Tc. However, it is very hard to generate a curved surface, and therefore, a threshold value curved line which is similar to the cured line Tc in the first order is generated.

Figure 1D:
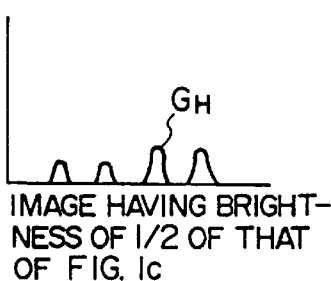
Figure 1G:
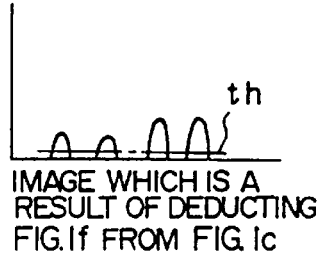
Figure 1E:
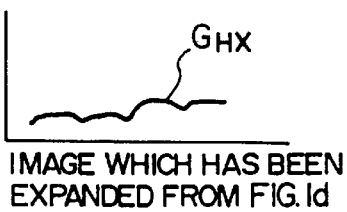
Figure 1F:

More specifically, an image $G_H$ which has a density of ½ of that of each picture element in the differentiated image G is generated as shown in FIG. 1d. The peak value of the contrast of this image $G_H$ shows an intermediate value of the contrast of the original differentiated image. By further repeating an expansion processing of the density by several times, an image $G_{HX}$ is obtained as shown in FIG. 1e. This image is further smoothed to obtain an image C which is very similar to the ideal threshold value as shown in FIG. 1f. Then, the original differentiated image G is compared with the generated threshold value image C, and the image is binary expressed by extracting only the picture elements for which the density of the differentiated image is larger than that of the threshold value image, so that a clear binary image can be generated.

The expansion processing of the variable density in the above is the so-called local maximum value filter. In the second-order plane, a maximum value is taken from among densities $f_1, f_2, \ldots, f_9$ of 3×3 picture elements of an input image f as shown in FIG. 3, and this value is outputted as F in accordance with a processing shown by the following expression.

$$F(i, j) = \max[f(i + u, j + v)]$$
$$(u, v) = -1, 0, +1$$

There is a smoothing processing method for outputting an average value of density of 3×3 picture elements, as one example.

Figure 4:
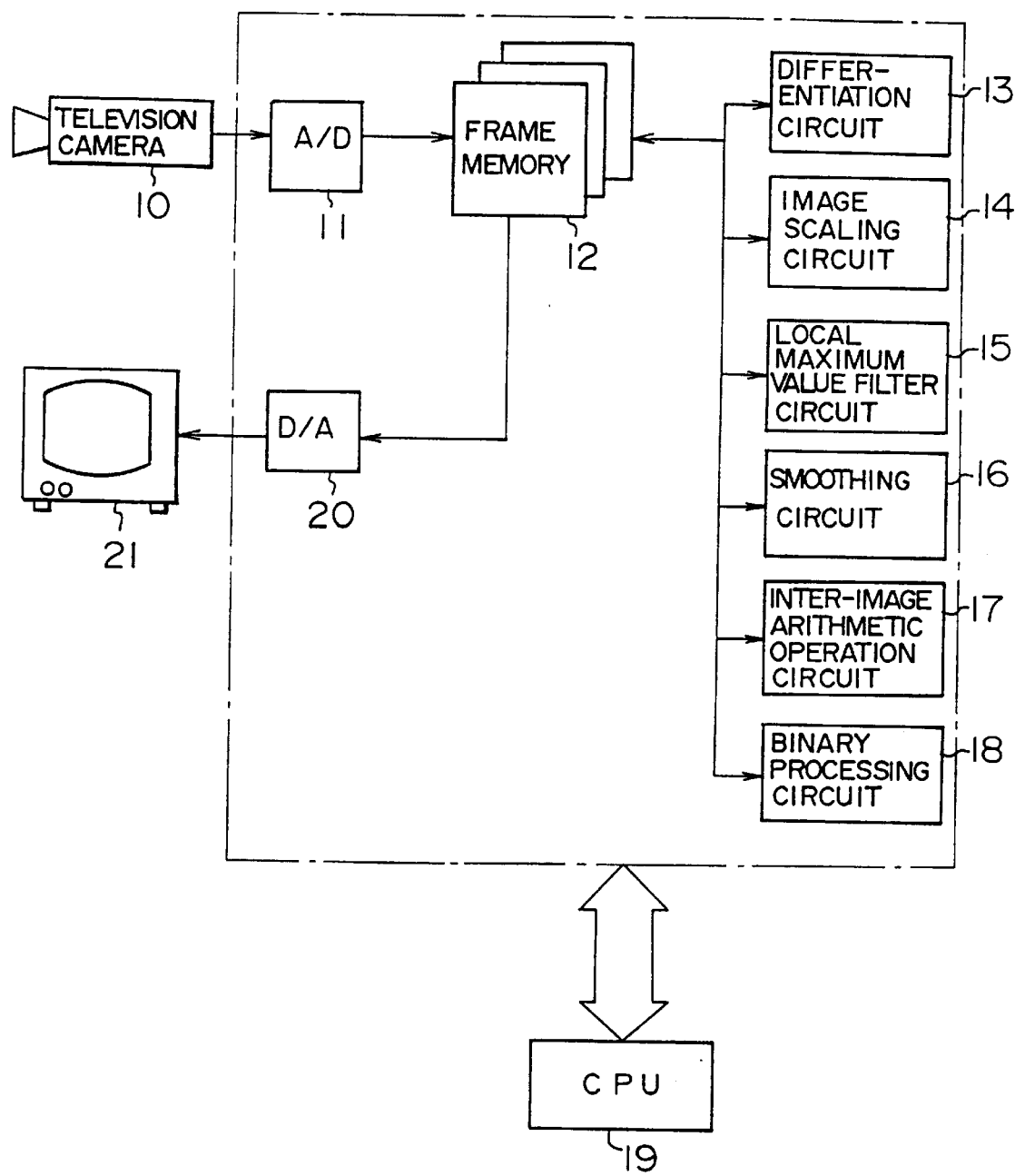
FIG. 4 is a configuration diagram of the system in one embodiment of the present invention.

FIG. 4 shows an example of the configuration of the present invention. The invention comprises a television camera 10, an A/D converter 11, a frame memory 12, a differentiation circuit 13, an image scaling circuit 14, a local maximum value filter circuit 15, a smoothing circuit 16, an inter-image arithmetic operation circuit 17, a binary circuit 18, a CPU 19, a D/A converter 20, and a monitor 21.

With the above-described structure, when an image is picked up by the television camera 10 or the like, an image signal is converted into density data having, for example, 128 gradations by the A/D converter 11 and is stored in the frame memory 12. The frame memory 12 has k pieces ($G_1$ to $G_k$) of density memories having, for example, 256 ×256 picture elements, and also has pieces ($B_1$ to B) of binary frame memories when necessary.

Detailed description will be made below in accordance with the processing procedure by assuming that an input frame has been stored in the image memory of $G_1$.

First, the image in $G_1$ is differentiated by the differentiation circuit 13 and the result is stored in the frame memory of $G_2$. This image is an object image to be binary processed. An image having the brightness of 1/n of that of the image in $G_2$ is generated by the image scaling circuit 14 and is stored in $G_3$. Usually, this n takes a value of 2, but it may also take a value of 3 or 4 to match the quality of the object image. (A real number of 1.5 for example can also be taken.) An expansion processing of the density is performed to the image in $G_3$ by the local maximum value filter circuit 15 and the result is stored in $G_4$. The local maximum value filter circuit 15 usually takes a maximum value of the density of 3×3 picture elements, and therefore the quantity of expansion is small when only one processing is carried out. Accordingly, the expansion processing of the density of the image in $G_3$ is repeated by several times and the result is stored again in $G_4$. The number of repetitions of the processing is decided to be the one at which the width of the edge expands (that is, approximately five times). Further, the expanded image in $G_4$ is smoothed by the smoothing circuit 16 to generate a smooth curve. The smoothing processing is also repeated several times, and then the result is stored in $G_5$.

The image in $G_5$ is a threshold value image, and the density of this image is compared with the density of the original differentiated image in $G_2$ for each picture element. Then, the result is expressed in binary data. A detailed processing is such that, as shown in FIG. 1g, the density of the threshold value image $G_5$ (C in FIG. 1f) is subtracted from the density of the differentiated image $G_2$ (G in FIG. 1c) by the inter-image arithmetic operation circuit 17. The image obtained in this case becomes the information of the differnetiation image having a higher density than that of the threshold value image. In order to have the effect of eliminating noise from this image, a certain threshold value th is set (about two to three gradiations) and the image information is binary processing processed by the binary circuit 18. By the above processing, a binary image having the intermediate value of brightness as the threshold value can be obtained.

Figure 5A:
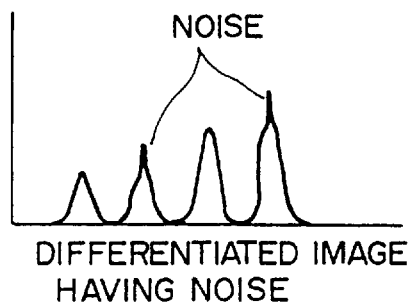
FIGS. 5a to 5c are diagram for explaining an example of the case in which a differentiated image includes noise.
Figure 5B:
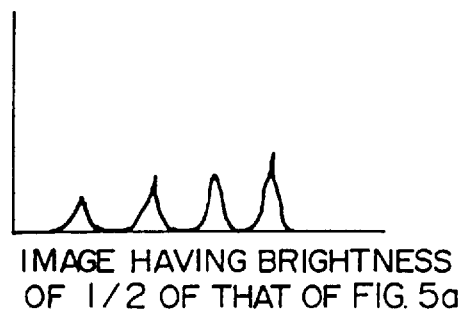
Figure 5C:
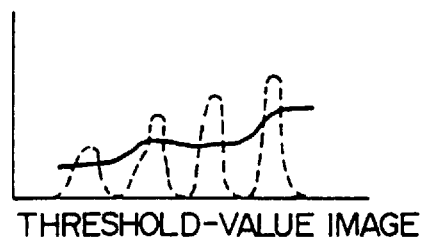

However, it is not convenient to carry out only the above-described one series of processing, if there are bright portions in the noise of the differentiated image as shown in FIG. 5a. When an image having ½ of the brightness of that of the image in FIG. 5a is generated as shown in FIG. 5b and this image is then expanded by the local maximum value filter, the threshold value image becomes the one having a high level due to the noise as shown in FIG. 5c. As a result, it becomes impossible to extract the peripheral portions of the noise. In order to solve this problem, after the image having ½ of the brightness (this may be 1/n) is generated, the smoothing processing is carried out several times to reduce the noise and the result is expanded by the local maximum value filter. The similar processing is repeated. By this arrangement, it becomes possible to prevent variations of the threshold value due to noise.

When there is little noise, it is possible to extract density satisfactorily without any smoothing processing as described previously. Therefore, presence or absence of the smoothing processing may be determined by considering the processing time required. In order to eliminate noise, the same effect can also be obtained if the scaling processing of 1/n is performed after an image for binary processing (a differentiated image in this case) has been smoothed by several times.

Described above, are various methods including a method of how to decide the value of n, a method of smoothing an image after an image of the brightness having 1/n or the differentiated image has been generated, and a method of generating an image having the brightness of 1/n after the image has been smoothened.

In order to select a method which is most suitable for a certain object, the following methods are provided:

① Results of all the previous processings are displayed, and the user selects a previous processing which he (she) considers is the most suitable.

② Results of the previous processings are recognized for character recognition, and a previous processing having the highest recognition rate is selected.

③ The user designates areas to be extracted in advance, and a previous processing which shows the result most similar to the pre-set information is selected.

Figure 6A:
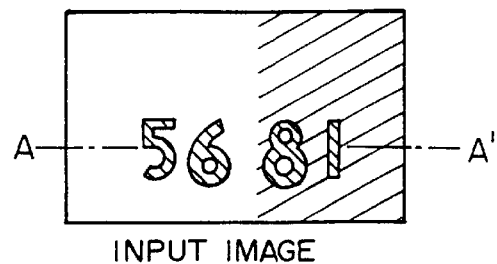
FIGS. 6a to 6e are diagrams for explaining the procedure of generating a contrast image from an input image having variable density.
Figure 6B:
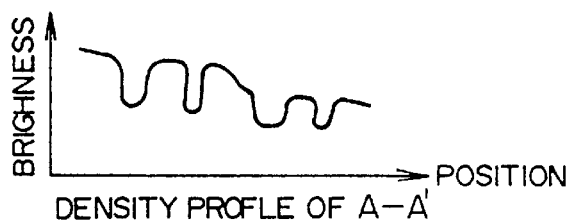

The present embodiment is a method which can decide a binary threshold value satisfactorily when picture elements to be extracted have certain density and the rest of the picture elements almost have a value of "0" (hereinafter referred to as a half-contrast binarizing method). Accordingly, this method cannot be applied to such a general image having variable density in which areas other than those which are to be extracted also have certain density values. Another embodiment of the present invention which can also be applied to this situation will be explained below. FIGS. 6a and 6b show objects which include characters as a general image having variable density.

Figure 6C:
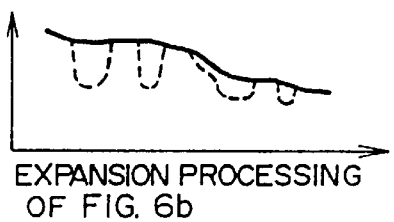
Figure 6D:
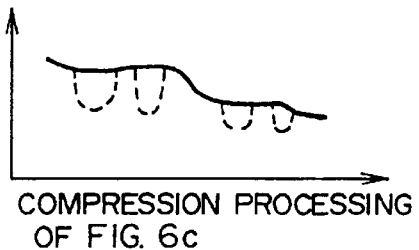

In expressing a general image having variable density in binary values by the method explained in the above embodiment, the density of the background of the characters may be converted to the "0" level. Since only contrast of the characters remains as a result of this processing, the above-described half-contrast method can be applied. Therefore, the method of the JP-A-63-153682 is used for the conversion. According to this method, a background image is generated from an input image, and this background image is subtracted from the input image so that an image of the density information to be extracted (for example, a character contrast image in the case of a character image) is generated. As a result, it is possible to generate an image in which the character portion has density corresponding to its contrast and all the other background has "0". Thus, it is possible to generate an image which is similar to the above-described differentiated image, so that the binarizing method of the present invention becomes valid. The processing for the elimination of this background will be briefly explained below. FIG. 6a shows an input image, and the density information of one line A-A' in FIG. 6a is shown in FIG. 6b. The latter diagram shows the case of extracting black characters. In order to generate a background image, the above-described local maximum value filter circuit 15 is used to carry out expansion processing of the brightness by several times. Then, the recess portions of the characters are buried by the surrounding brightness as shown in FIG. 6c. This image is further compression processed several times by a local minimum value filter in the same manner as the expansion processing so that a background image is obtained as shown in FIG. 6d. The local minimum value filter processing is the processing having the reverse function of the local maximum value filter, and produces an output F(x, y) which is a minimum value of the density f(x, y) of a local area. This is given by the following expression:

$$F(i, j) = \min[f(i + u, j + v)]$$
$$(u, v) = -1, 0, +1$$

Figure 6E:
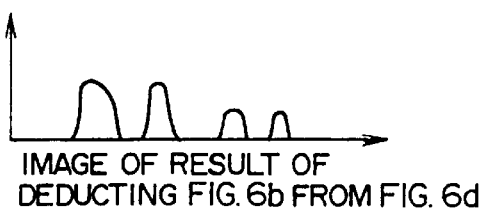

After generating the background image, difference of brightness between the original input image and this background image is obtained, and a contrast image having the background density "0" is generated as shown in FIG. 6e. This method is referred to as a background differentiation method.

In this image, variance of brightness of the background can be eliminated, but difference of contrast among characters cannot be corrected. Therefore, the image cannot be expressed in binary data based on a fixed threshold value. Accordingly, when the above-described half-contrast binarizing method is applied to this image, a satisfactory binary image can be generated.

The above description refers to the processing of black characters. In the case of white characters, the above background differentiation method is applied after a reverse processing of an input image has been carried out, or projected portions of characters are deleted by using filters in the order of the local minimum value filter and the local maximum value filter. As a result, the similar effect can be obtained.

When the background differentiation method is to be used, the processing can be facilitated if the local minimum value filter circuit is added to the configuration of FIG. 4.

Next, one embodiment of the present invention which enables a satisfactory recognition of characters that have been picked up from a slant angle and have distortion will be explained below with reference to FIGS. 7 to 12d.

Figure 8A:
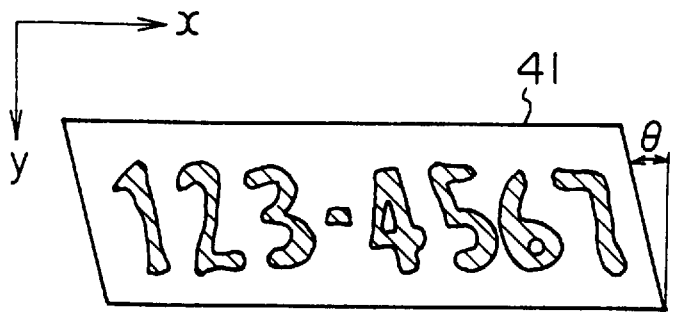
FIGS. 8a to 8c are diagrams for explaining a projection pattern of distorted characters that are obtained by picking up an image in a slant direction.
Figure 8B:
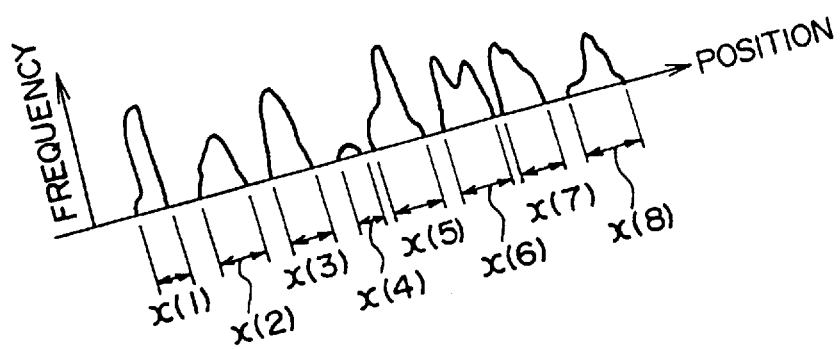
Figure 8C:
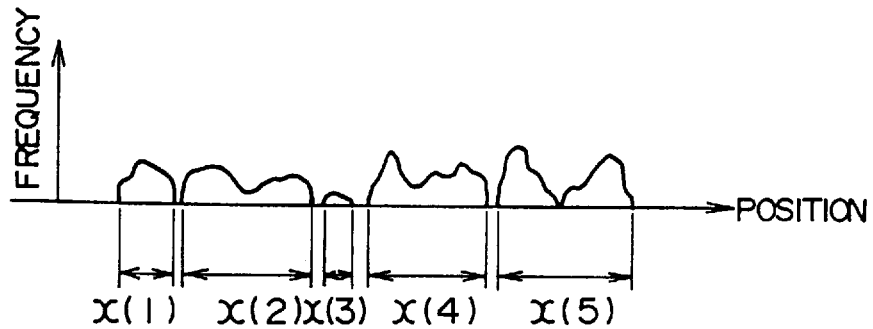

FIGS. 8a and 8b are diagrams for explaining how to obtain a distortion angle of a character string. Assume that a distortion angle of a distorted character string 41 in FIG. 8a is θ. This distorted character string has no distortion in its horizontal direction but is distorted in the vertical direction toward the left side by the angle θ. In the present embodiment, a projection pattern of the distorted character string in the direction of the distorted angle θ is obtained. A result obtained is shown in FIG. 8b. A projection pattern of the distorted character string 41 in FIG. 8a in the vertical direction is obtained as shown in FIG. 8c. The projection pattern in the vertical direction shows that the numbers "2" and "3", the numbers "4" and "5" and the numbers "6" and "7" are connected together respectively. When the direction of obtaining the projection pattern is gradually inclined toward the direction of the distortion angle θ, the connected patterns are separated and the respective widths of the projection patterns of the respective numbers become smaller as shown in FIG. 8b. An angle minus 90 degrees θa−90° with respect to the horizontal direction in this case (in the present embodiment, the angle in the vertical direction is zero degree) is the distortion angle in the present embodiment.

In order to detect the state shown in FIG. 8b, the total sum Σx(i) of the widths x(i) of the projection pattern is obtained for the i in the present embodiment.

$$xd(\theta) = \sum_i x(i)$$

The angle θ is gradually changed from the above-described zero degree, to obtain θ at which the total sum Σx(i) becomes a minimum value. Thus, the distortion angle is obtained. The lateral axial direction in FIG. 8b will hereinafter be called a scanning direction. In other words, in the present embodiment, this scanning direction will be inclined gradually.

Figure 7:
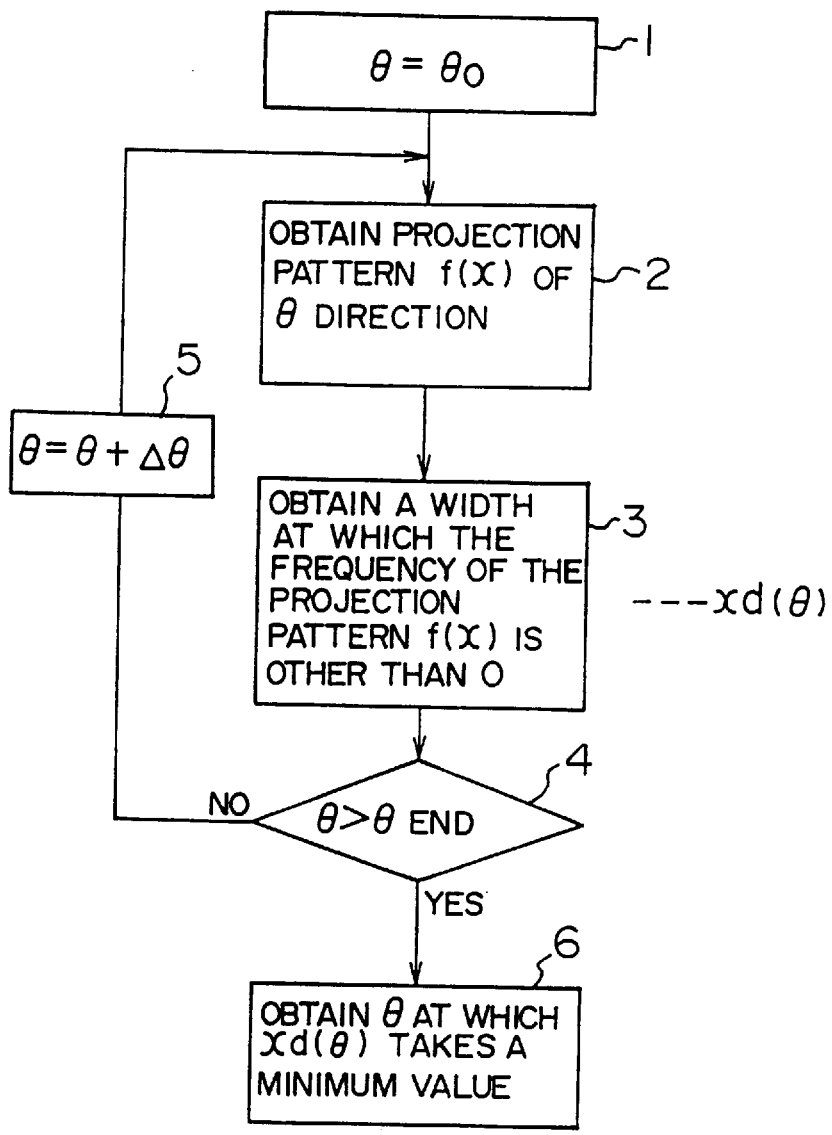
FIG. 7 is a flowchart for explaining the processing procedure of obtaining a distortion angle in a character recognition unit which is one embodiment of the present invention.
Figure 9:
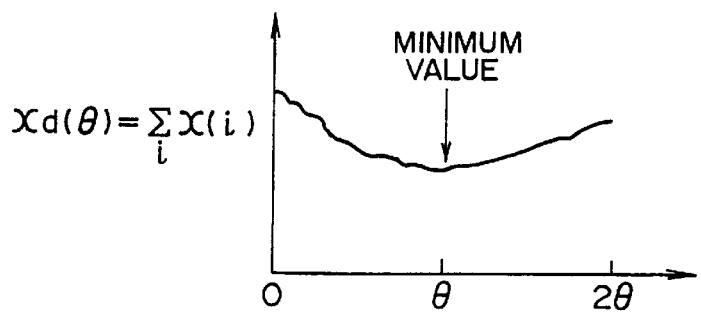
FIG. 9 is a graph showing the relationship between a projection width and a scanning angle.

FIG. 7 is a flowchart showing the procedure for obtaining θ at which the above-described total sum Σx(i) is a minimum value. First, an initial value θ₀ in the scanning direction is set in Step 1, to obtain a projection pattern f(x) of the θ direction by a projection distribution circuit described later (Step 2). Next, numbers of frequency of the projection distribution f(x) other than zero are obtained by a projection width extraction circuit described later (Step 3), and this is set as the xd(θ) described above. Next in Step 4, this θ is compared with θ end (the θ end is a final direction of declining the scanning direction: a maximum slope direction obtained from the relationship between a camera disposition position and a character string of an object to be recognized). If θ<θ end, then Δθ is added to the value of θ in Step 5, and the added value is used as a new value of θ and the step returns to Step 2. If θ≧θ end, then the step proceeds to Step 6 and a minimum value is obtained by a minimum value detection circuit from values of xd(θ) which have been obtained at each Δθ interval (the values of xd(θ) obtained at each Δθ interval are plotted on a graph to have a result as shown in FIG. 9). Then a value of θ at which a minimum value is obtained is obtained. The value of θ thus obtained becomes the distortion angle in the present embodiment.

The present embodiment assumes the case where characters are distorted toward the left side and the distortion of the characters in the left direction is positive, with zero degree in the vertical direction with respect to the character string. Therefore, when the characters are distorted toward the right side, the value of Δθ is set as a negative value, or an initial value in the scanning direction is selected as a maximum value of the negative side, for example, −20 degrees.

Figure 10:
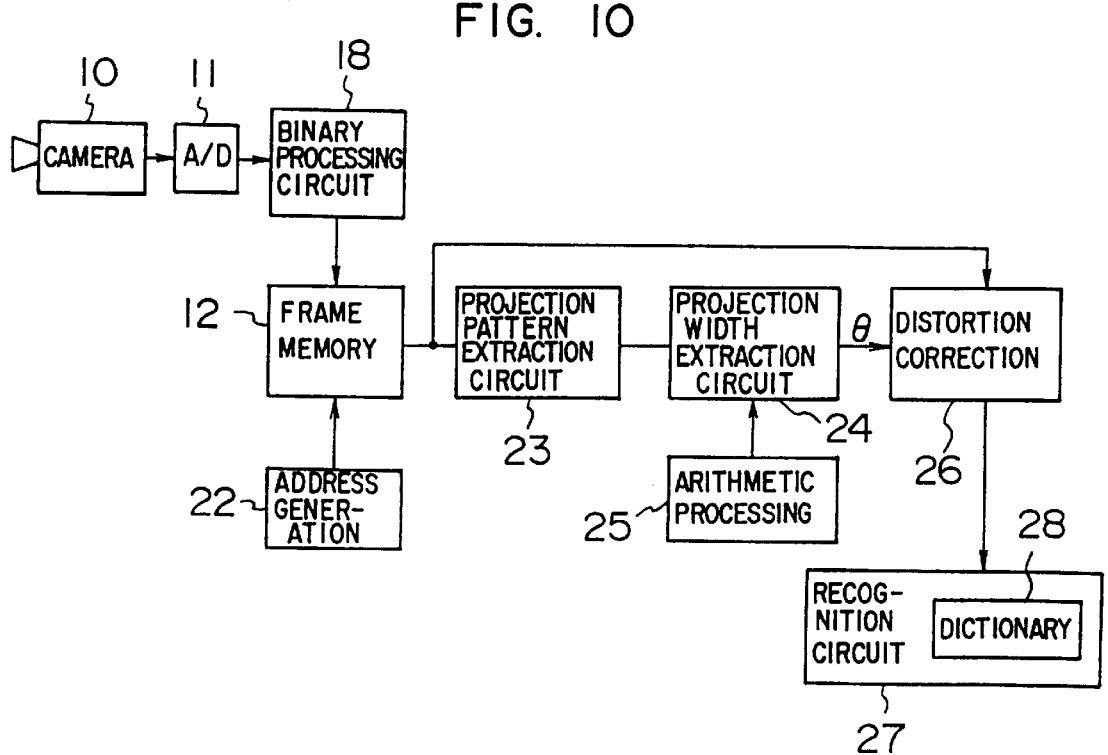
FIG. 10 is a diagram for explaining the configuration of a character recognition unit which is one embodiment of the present invention.

FIG. 10 is a block configuration diagram of a character recognition unit in an information processing unit relating to one embodiment of the present invention. The character recognition unit of the present embodiment comprises a television camera 10 for picking up a character string to be recognized, an A/D (analog to digital) converter 11 for converting a signal picked up by the television camera 10 into a digital signal having 7 to 8 bits, a binary circuit 18 for changing the image signal converted into a digital signal to binary values at a predetermined threshold value, a frame memory 12 for storing the signal of an image picked up by the camera 10 as binary data, an address generation circuit 22 for generating an address signal to be used when data is read from the frame memory 12, a projection pattern extraction circuit 23 for extracting a projection pattern (FIGS. 8b and 8c) of the data of the picked-up image read from the frame memory 12, a projection width extraction circuit 24 for calculating the above-described distortion angle θ to obtain a projection width xd(θ) of an image picked-up signal, an arithmetic processing circuit 25 for carrying out an arithmetic processing in the projection width extraction circuit 24, a distortion correction circuit 26 for correcting an output data (distorted character string data) from the frame memory 12 at the distortion angle θ, and a recognition circuit 27 for recognizing characters by comparing the character string data corrected by the correction circuit 26 with dictionary data 28 storing separation of characters, for each word in the character string.

Since the data stored in the frame memory 12 is a binary image, it takes values of "0" and "1". Usually, a picture element of a character line (a minimum unit of) takes the value of "1" and the background takes the value of "0". The frame memory 12 is addressed by a horizontal value x and a vertical value y. By designating an address having values of x and y, it is possible to read a value of data g (x, y) of a desired picture element. When an address which matches a scanning direction is given from the address generation circuit 22, character string data in the scanning direction is outputted to the projection pattern extraction circuit 23.

The projection pattern extraction circuit 23 obtains $$f(x) = \sum_y g(x, y)$$

for the picture element data g (x, y) having the address (x, y). In other words, the projection pattern extraction circuit 23 extracts a number of picture elements of the character at the coordinates x.

The projection width extraction circuit 24 counts numbers of f(x) other than zero for the projection pattern f(x) obtained by the projection pattern extraction circuit 23, thereby to obtain the total width xd(θ) of the projection.

The above processing is repeated each time when the scanning direction is changed, and among the values of xd(θ) obtained the value of θ at which the xd(θ) takes a minimum value is taken as the distortion angle θ and is outputted in the distortion correction circuit 26.

Figure 17:
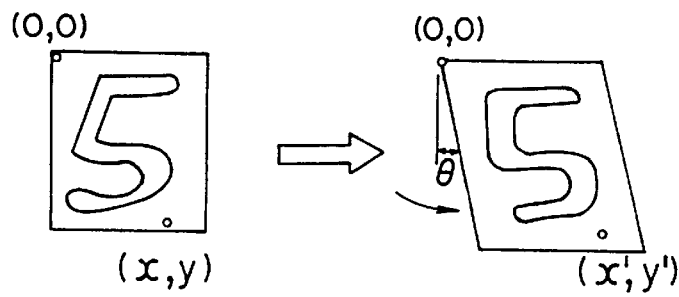
FIG. 17 is a diagram for explaining the character which has been distorted.

The distortion correction circuit 26 corrects distorted characters by using the distortion angle θ. A string of laterally written characters has a distortion as shown in FIG. 17 when looked at from below a slant angle. When coordinates of a desired point of the character in the normal state (the left side) are (x, y) and coordinates corresponding to this point of the distorted character (the right side) are shown as (x', y'), there is the following relationship between the two coordinates:

$$x' = x + \tan\theta \cdot y$$
$$y' = y$$

In other words, there is a deviation in only the x position and there is no change in the y position. Accordingly, the distorted character can be corrected by correcting only the value of x.

In the present embodiment, an angle at which the projection width of a position where there are characters becomes a minimum is obtained. However, it is needless to mention that the same effect can also be obtained when an angle at which a projection width of a gap between two characters becomes a maximum.

If it is assumed that a character distortion angle is 20 degrees from the angle zero and a cut angle Δθ is two degrees, then the above-described series of processing needs to be carried out 11 times of every two degrees starting from zero degree to 2 degrees, 4 degrees, ---, 18 degrees and 20 degrees. The processing which takes time most among the above-described series of processing is the processing for obtaining a projection pattern. Therefore, the processing time can be reduced if the number of processing for this purpose is reduced. Description will next be made of an embodiment for reducing the number of processing.

Figure 11:
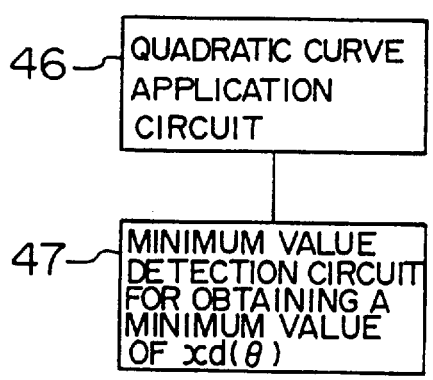
FIG. 11 is a flow chart showing the procedure for obtaining a minimum value of a projection width by calculation.

In the general character recognition, it is possible to recognize characters without any correction if the magnitude of character distortion angle is within about ±5 degrees. Therefore, it follows that the distortion angle θ may be detected with the accuracy of a minimum ±5 degrees. Thus, only three scannings are carried out as shown in FIG. 11 (scanning angles are expressed as $\theta_1$, $\theta_2$ and $\theta_3$). Projection widths for the individual scannings are expressed as xd($\theta_1$), xd($\theta_2$) and xd($\theta_3$). These three values are applied to the following expression (Step 46 in FIG. 11):

$$xd(\theta) = a\theta^2 + b\theta + c \qquad (1)$$

More specifically, the following expressions are used:

$$xd(\theta_1) = a\theta_1^2 + b\theta_1 + c \qquad (2)$$

$$xd(\theta_2) = a\theta_2^2 + b\theta_2 + c \qquad (3)$$

$$xd(\theta_3) = a\theta_3^2 + b\theta_3 + c \quad (4)$$

By using the above equations, the values of a, b and c are obtained as follows:

$$a = (\tfrac{1}{2}) \cdot [xd(\theta_3) - 2 \times xd(\theta_2) + xd(\theta_3)] \quad (5)$$

$$b = 2 \cdot xd(\theta_2) - 1.5 \times xd(\theta_1) - 0.5 \times xd(\theta_3) \quad (6)$$

$$c = xd(\theta_1) \quad (7)$$

The expression (1) is differentiated to obtain a minimum value of xd (θ) as follows:

$$xd(\theta)' = 2a\theta + b$$

Thus, θ which takes an extremum value becomes $$\theta = -b/(2a)$$

Figure 12A:
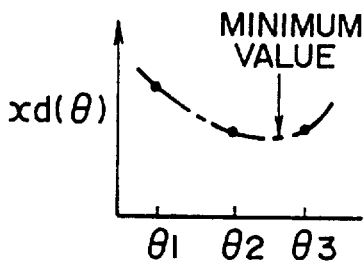
FIGS. 12a, 12b, 12c and 12d are diagrams for explaining the case of obtaining a minimum value of a projection width from three angles by calculation.
Figure 12B:
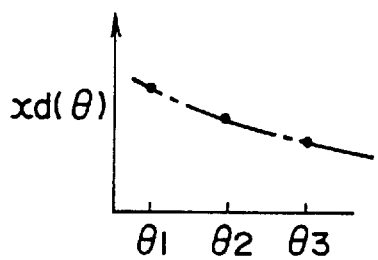
Figure 12C:
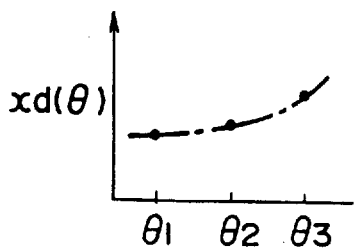
Figure 12D:
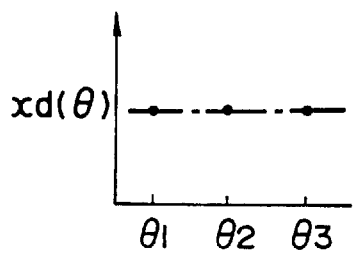
Figure 13:
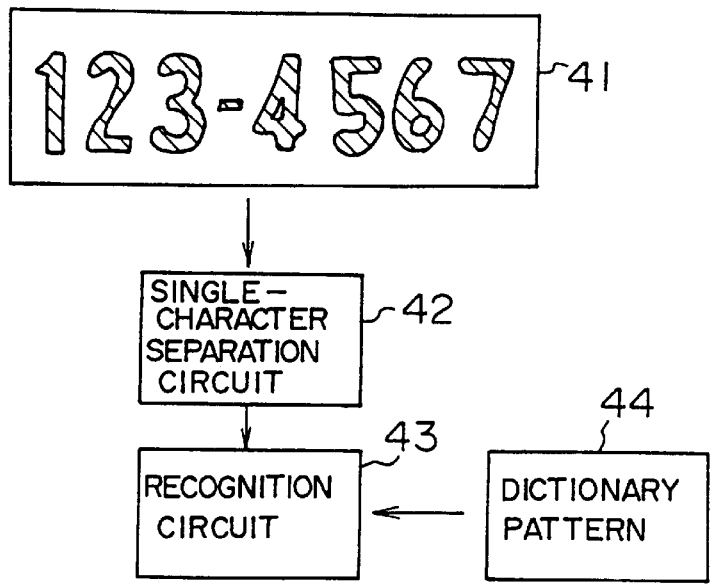
FIG. 13 is a diagram for explaining the conventional character recognition unit.
Figure 14:
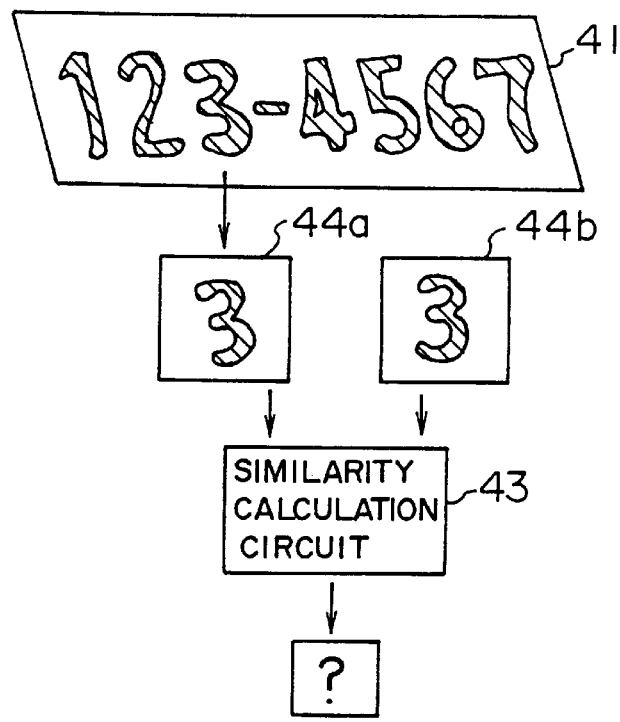
FIG. 14 is a diagram for explaining a problem point when distorted characters are inputted by the conventional character recognition unit.
Figure 15:
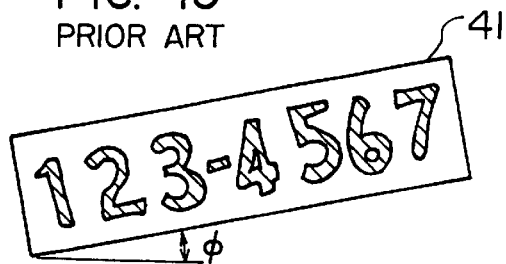
FIG. 15 is a drawing for explaining the character string recognized by the conventional character recognition method.

If no extremum value is taken within the range of $\theta_1$, $\theta_2$ and $\theta_3$ as shown in FIGS. 12a to 12d, the following processing is carried out because of FIGS. 12b, 12c and 12d.

When $\theta_0$ obtained as an extremum value is within the range from $\theta_1$ to $\theta_3$ and when xd ($\theta_0$) is smaller than any one of $xd(\theta_1)$, $xd(\theta_2)$ and $xd(\theta_3)$, the $\theta_0$ is taken as the distortion angle. In other cases, θ having the smallest value among $xd(\theta_1)$, $xd(\theta_2)$ and $xd(\theta_3)$ is taken as the distortion angle. When all the values are the same (that is, when the above-described coefficient a becomes 0), a value of an angle closest to the angle of the vertical direction with respect to the character string among $\theta_1$, $\theta_2$ and $\theta_3$ is taken as the distortion angle. The above processing is carried out in Step 47 in FIG. 11.

By the above arrangement, the number of processings for obtaining a projection time can be reduced to three, with resolution of about ⅓ of the cut of $\theta_1$, $\theta_2$ and $\theta_3$ to have a satisfactory accuracy for the recognition of characters.

When a number plate is looked at from below the left angle, for example, characters observed are distorted toward the left side. If the above-described processing is carried out to the character string at angles of, for example, zero degree, 10 degrees and 20 degrees respectively, the distortion angle θ of the characters is obtained. When the number plate is looked at from below the right angle, the characters observed are distorted toward the right angle, contrary to the above case. Therefore, the above processing may be carried out at angles of zero degree, −10 degrees and −20 degrees respectively (the distortion toward the left side is expressed with positive signs).

Description has been made of the case where a character string lies laterally in the above embodiment. However, it is needless to mention that the present invention can also be applied to the case where a character string has a vertical layout, to which the similar processing can be applied to correct the distortion to ensure correct recognition of characters. In this case, contrary to the case shown in FIG. 17, distortion occurs because of the change in the y coordinates with no change in the x coordinates. Therefore, distortion of only the y coordinates is corrected in this case.

Figure 16:
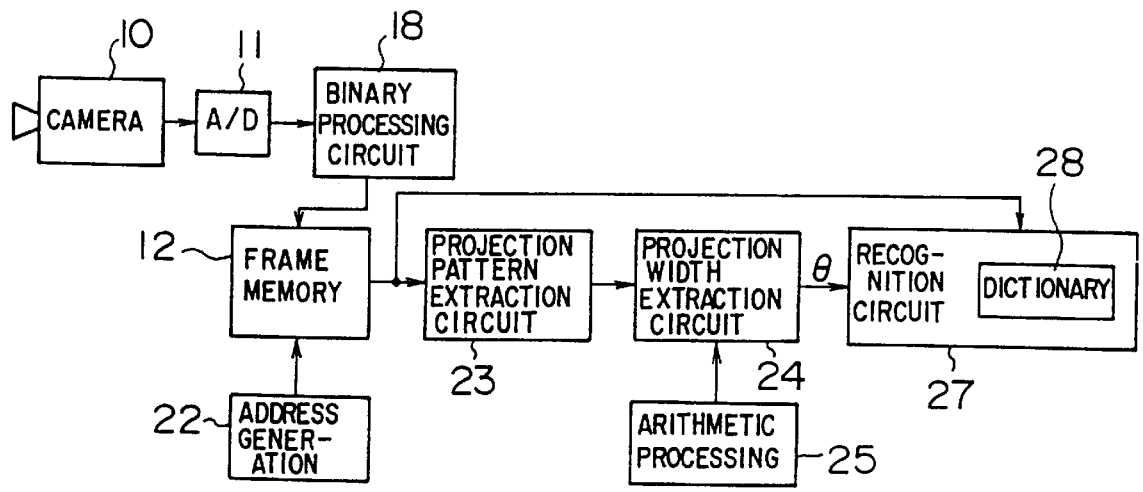
FIG. 16 is a drawing showing the configuration of a character recognition unit which is another embodiment of the present invention.

FIG. 16 is a block configuration diagram of the character recognition unit relating to another embodiment of the present invention. In the embodiment shown in FIG. 10, the characters of an image picked up (a distorted character) have been corrected at the distortion angle, and the corrected characters have been compared with the dictionary data so that the characters are recognized. However, in the present embodiment, the dictionary data 28 is corrected at the calculated distortion angle θ and the corrected dictionary data is compared with the distorted characters so that the characters are recognized.

Figure 18:
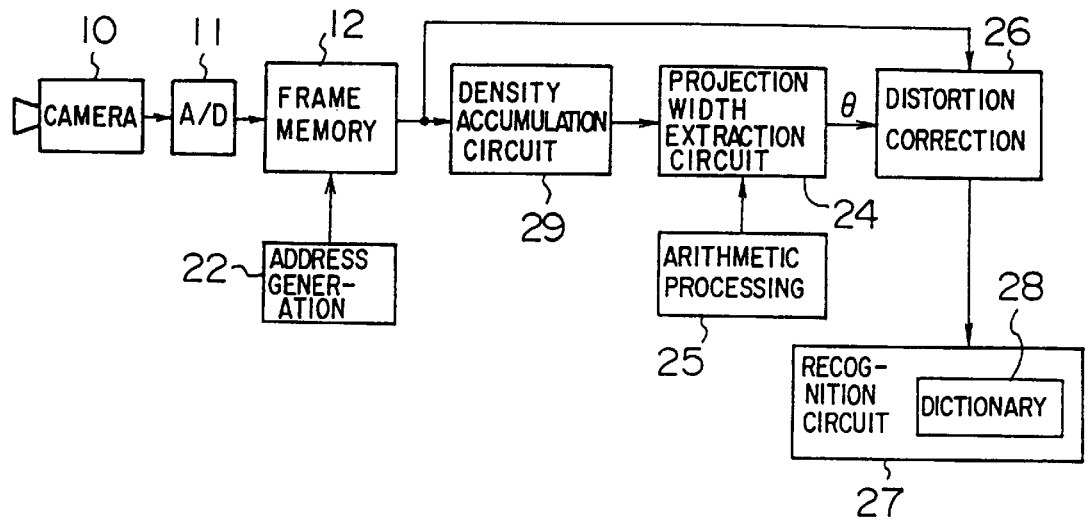
FIG. 18 is a diagram showing the configuration of a character recognition unit which is another embodiment of the present invention.
Figure 19:
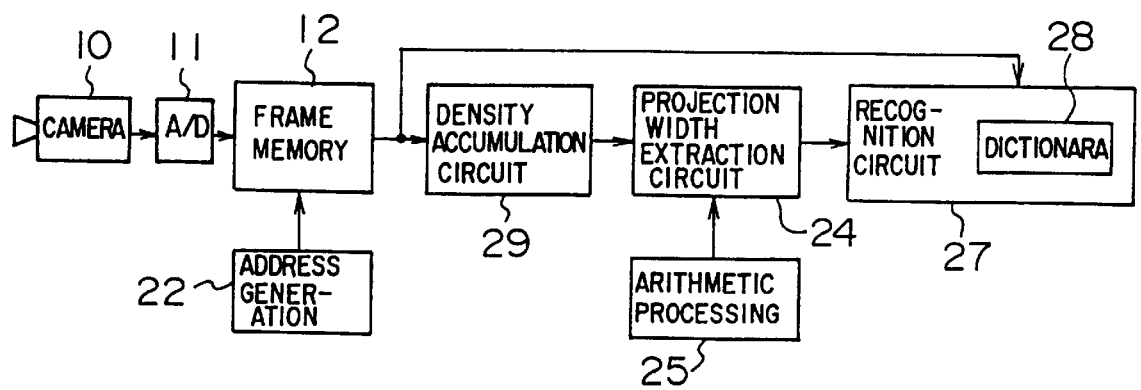
FIG. 19 is a diagram showing the configuration of a character recognition unit which is another embodiment of the present invention.

In each of the above-described embodiment, an image picked-up signal is changed into binary data, which is stored in the frame memory and then the number of picture elements of the image picked-up pattern is calculated. It is needless to mention that a distortion angle of the characters can also be obtained in the similar manner by distinguishing between the character area and the background area based on the density variation of the image picked-up signal. FIGS. 18 and 19 are block configuration diagrams of a character recognition unit for recognizing characters by obtaining the distortion angle θ from the density variation information of the image picked-up signal.

In the embodiment of FIG. 18, a signal of an image picked up by the camera 20 is A/D converted into a quantization signal of 7 to 8 bits by the A/D converter 11. The quantization signal is stored in the frame memory 12, the scanning direction data at a certain angle is read out from the frame memory 12, and the density is accumulated by the density accumulation circuit 29. Then, the width of the area of which density has been detected (alternately, this may be the area of the background portion of which density variations have not been detected) is extracted by the projection width extraction circuit 24, and the distorted characters are corrected by the correction circuit 26 at the distortion angle θ. The result is compared with the dictionary data 28 in the recognition circuit 27 so that the characters are recognized.

In the embodiment of FIG. 19, the dictionary data 28 is corrected at the obtained distortion angle θ, and the corrected dictionary data is compared with the distorted characters so that the characters are recognized.

Although the frame memory is used in each of the above-described embodiments, it is needless to mention that a high-speed CPU or the like is used and the images are picked up by the camera 10 each time an arithmetic processing corresponding to each scanning direction is carried out. In the case of recognizing characters by picking up car number plates of cars which come from the right direction and from the left direction by the camera 10 set at the center, for example, the character strings of the images picked up are distorted to the left side or to the right side. In such a case as described above, it is possible to correct the right and left distortions by carrying out the similar arithmetic operation between the maximum value of the distortion in the positive direction and the maximum value of the distortion in the negative direction. In the above-described embodiments, the distortion angle has been approximated from the data of three angles $\theta_1$, $\theta_2$ and $\theta_3$. However, in the case of four or five or more data, the method of the least squares may be used to obtain the distortion angle.

Next, description will be made of one embodiment of the present invention which can satisfactorily separate characters from a character string including characters which are contacted together.

Figure 21:
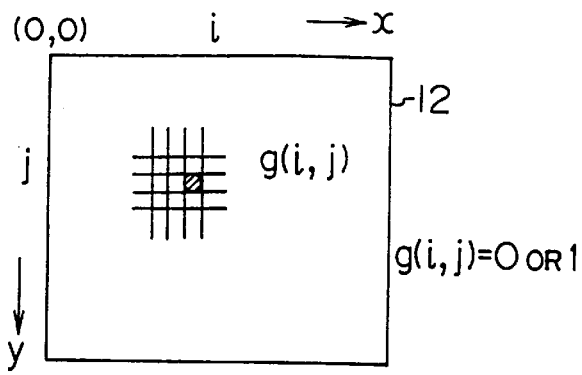
FIG. 21 is a diagram for explaining the frame memory.

FIG. 21 shows the configuration of the frame memory 12. When the horizontal direction is expressed by the x coordinates and the vertical direction by the y coordinates, an image data is stored by having a dot pattern g (x, y) usually having 256 splits in the x coordinates and 256 splits in the y coordinates. Since the value of one dot or one picture element takes a memory of a binary image, it takes a value of "0" or "1".

Figure 22A:
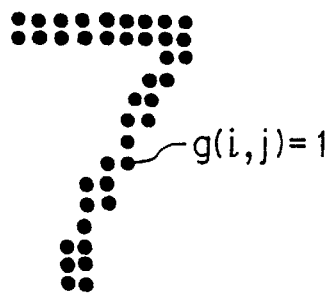
FIGS. 22a and 22b are diagrams for explaining the concept of the projection pattern.
Figure 22B:
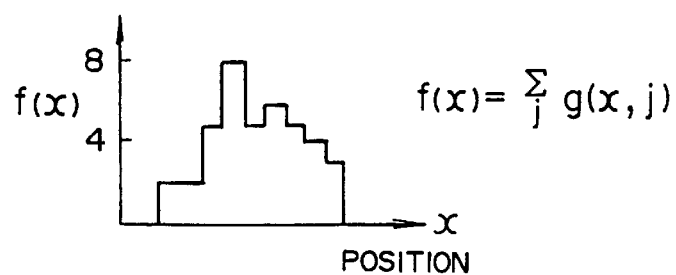

The projection pattern described with reference to the prior art is an accumulation of the value of picture elements of a character in the vertical direction. According to this method, as shown in FIGS. 22a and 22b, when data of certain picture elements is expressed by g(x, y) such that character picture elements are given as g(x, y)=1 and the rest of the picture elements are given as g(x, y)=0, $$f(x) = \sum_j g(x, j)$$

is obtained for all the x coordinates. FIG. 22a shows the character pattern and FIG. 22b shows its projection pattern.

Figure 23A:
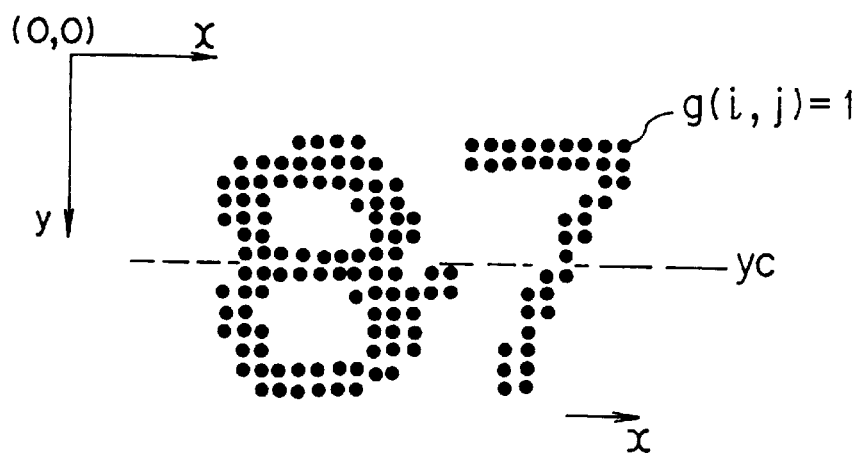
FIGS. 23a, 23b and 23c are diagrams for explaining the case where a projection pattern and a weight distribution are used.
Figure 23B:
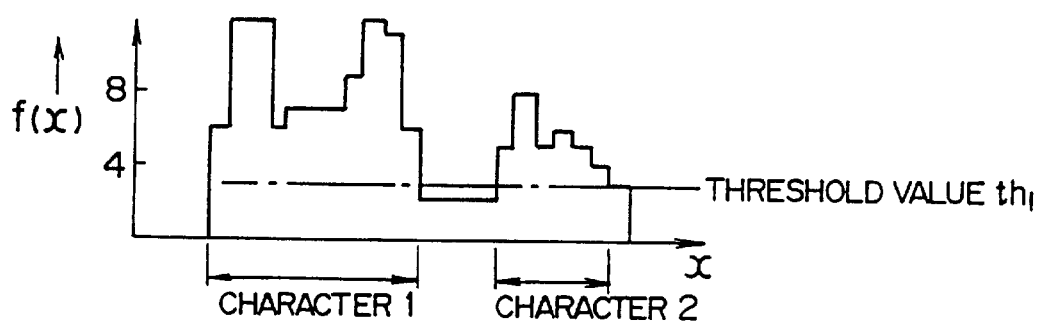
Figure 23C:
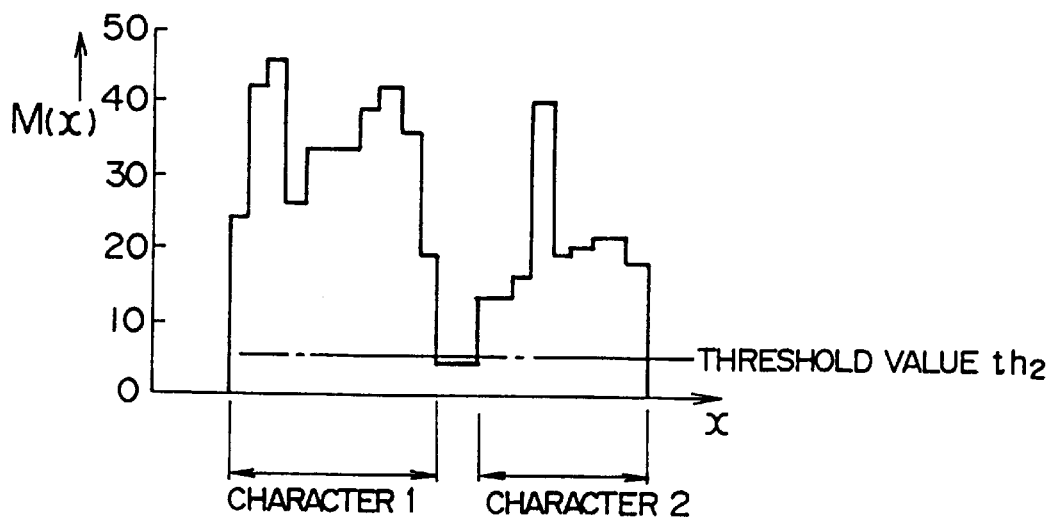

FIGS. 23a to 23c show the pattern that there is a "-" (hyphen) between "8" and "7". FIG. 23b shows a projection pattern f(x) of the pattern shown in FIG. 23a. When the characters are separated at a portion where the value becomes larger than a certain threshold value $th_1$, a part of the "7" is missed. Thus, instead of this projection pattern, a movement distribution M(x) around the center yc of the height of the character string shown in FIG. 23a is obtained. This moment distribution M(x) is obtained by the following expression:

$$M(x) = \sum_y \{|y - yc| \cdot g(x, y)\}$$

when the picture element of the character is "1"

$$M(x) = \sum_y \{|y - yc| \cdot \overline{g(x, y)}\}$$

when the picture element of the character is "0"

In the above, y represents the y coordinates for each picture element when the left top end of the frame memory 12 is selected as an origin. A center height yc of the character storing is a mid point of the area having a frequency larger than the threshold value after obtaining a projection pattern in the horizontal direction, for example.

The value of M(x) becomes larger when it is further from the center height yc of the characters. Therefore, the difference between the "-" (hyphen) and the lateral line of the upper portion of the "7" becomes clear as shown in FIG. 23c. Accordingly, when the characters are separated by the threshold value $th_2$, the character 1 ("8") and the character 2 ("7") can be satisfactorily extracted.

Figure 20:
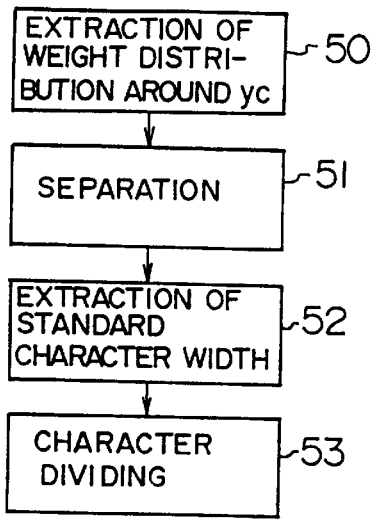
FIG. 20 is a flow chart showing the character separation procedure in a character separation circuit which is one embodiment of the present invention.
Figure 24A:
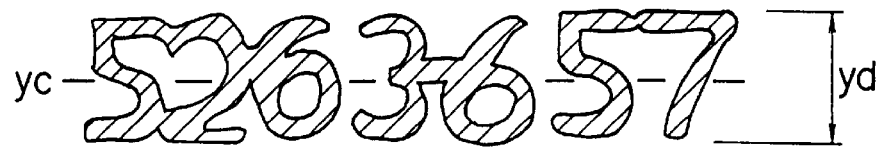
FIGS. 24a and 24b are diagrams for explaining an example of the case where a weight distribution is extracted and separated in a character string.

When characters are separated from the character string shown in FIG. 24a by the above-described method, it is possible to separate characters at portions where characters are in contact with each other near the center height yc of the character string by using the threshold value th, but it is not possible to separate the character 1 ("5" and "2") and the character 5 ("5" and "7"). Accordingly, an overall processing is carried out as shown in FIG. 20.

Figure 24B:
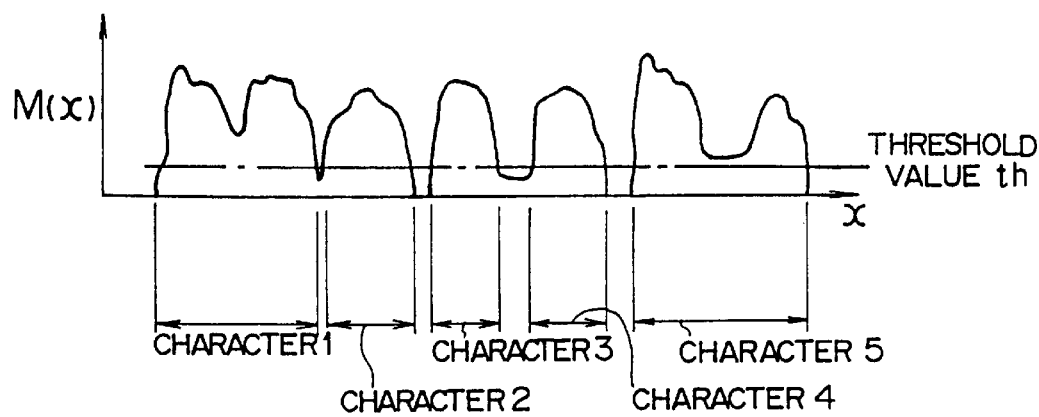
Figure 25:
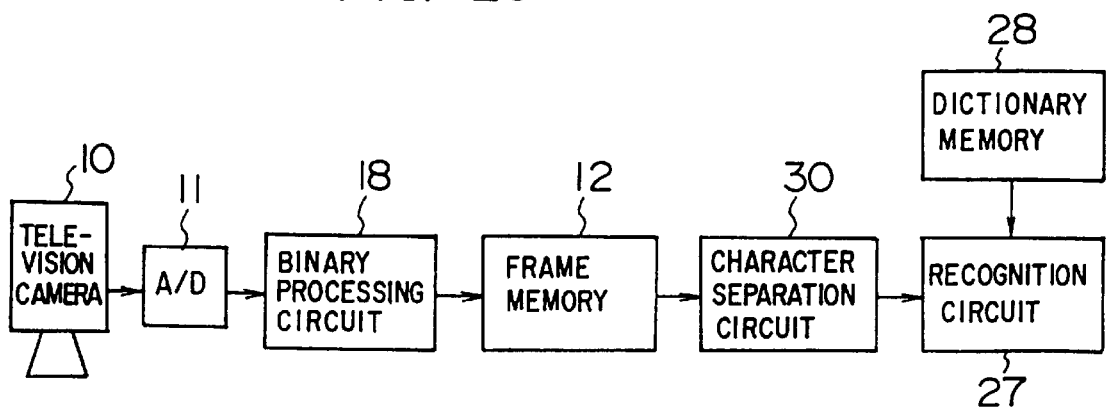
FIG. 25 is a diagram showing the configuration of a character recognition unit which is one embodiment of the present invention.

First, the above-described moment distribution M(x) is obtained by the moment distribution extraction circuit around yc (Step 50), next and the coordinates of the portions larger than the threshold value th (up coordinates) and the coordinates of the portions smaller than the threshold value th (dw coordinates) are obtained in the distribution by the separation circuit (Step 51). Then, the widths of the character blocks separated by the standard character width extraction circuit are obtained from the dw coordinates and the up coordinates, and an average character width is obtained by using only a character block which meets a predetermined width (Step 52). In the case of FIGS. 24a and 24b, the characters 2, 3 and 4 are the corresponding character blocks, and an average value of the character widths for these character blocks is obtained. If there is small number of blocks which satisfy a predetermined value (for example, two blocks or below), precision of the standard character width becomes poorer. Therefore, in this case, a mean value of the character widths is estimated from the average height yd of the whole character string. When a standard character width is expressed as x—s, it is obtained as follows:

x—s=d×yd (where d is set in advance)

Then, character blocks which cannot be separated by the threshold value th in the moment distribution M(x) (characters 1 and 5 in FIG. 24b) are separated by using the character separation circuit (Step 53). More specifically, how many characters of a standard character width will correspond to the width Xd of the character blocks is obtained by β=Xd x x—s by using x—S. For example, in the case of two characters, the center x coordinates of xd are obtained, the size of the moment distribution M(x) is checked within the range of ±γ (an error range of the character width is set) for the x coordinates, and the characters are separated by the x coordinates having the minimum M(x). In the case of three characters, the characters can be satisfactorily separated by dividing them into three equal portion in the similar manner.

By the above method, characters can be separated satisfactorily by having an error range of ±γ even if distances between characters vary to some extent (distance between characters vary depending on quantization errors, thickness of characters, etc. even if characters are printed with equal intervals).

Since the moment distribution M(x) is obtained around the center height yc of characters, a separation position occurs at the center of each character in the case of English characters "H" and "N". Thus, this method has a drawback of having such an inconvenience in the case of English characters. However, numbers can be separated securely by the above-described M(x) processing because all of 0 to 9 have a line at least at the upper side or the lower side.

We claim:

1. A character recognition unit: comprising a frame memory circuit changing an image picked-up signal which is obtained by horizontally and vertically scanning a character string to be recognized into binary data, changing the binary data into picture elements and storing the picture elements;

address designation means for designating an address of said frame memory, scanning the picture elements stored in said frame memory from said address in a predetermined direction and reading the stored pictures;

projection pattern extraction means for extracting a projection pattern comprised of a number of picture elements expressing said character string of picture elements read out by said address designation means;

projection width extraction means for obtaining a projection width, said projection width comprised of at least one of a number of scanning lines and a width of scanning lines, when a projection value of said projection pattern is not "0"; distortion angle detection means for gradually changing direction of said scanning lines to obtain a scanning direction as a distortion angle when said projection width becomes a minimum;

means for separating each picture element from said character string;

correction means for correcting only one of horizontal direction component and vertical direction component of each of at least one of the character data and dictionary data corresponding to each character;

recognition means for recognizing characters by comparing at least one of the corrected character data and corrected dictionary data with at least one of the non-corrected dictionary data and the non-corrected character data; and means for obtaining a distortion angle of said character string such that there are three scanning directions of $\theta_1$, $\theta_2$, and $\theta_3$, projection widths obtained in said respective directions are $xd(\theta_1)$, $xd(\theta_2)$, and $xd(\theta_3)$, which are applied to an expression of $xd(\theta)=a\theta+b\theta+c$, and a value of $\theta$ which takes a minimum value in said quadratic curve is selected as said distortion angle.

2. A character recognition unit comprising: a frame memory for storing variable density data obtained by horizontally and vertically scanning a character string to be recognized;

address designation means for designating an address of said frame memory, scanning the variable density stored in said frame memory from said address in a predetermined direction and reading the stored data;

density accumulation value calculation means for obtaining a density accumulation value which represents said character string of image data read out by said address designation means;

projection width extraction means for obtaining a projection width, said projection width comprised of at least one of a number of scanning lines and a width of scanning lines, when said density accumulation value is not "0";

distortion angle detection means for gradually changing direction of said scanning lines to obtain a scanning direction as a distortion angle when said projection width becomes a minimum;

means for separating each character data from said character string;

correction means for correcting only one of horizontal direction components and vertical direction components of each of at least one of the character data and dictionary data corresponding to each character;

recognition means for recognizing characters by comparing at least one of the corrected character data and corrected dictionary data with at least one of the non-corrected dictionary data and the non-corrected character data; and means for obtaining a distortion angle of said character string such that there are three scanning directions of $\theta_1$, $\theta_2$, and $\theta_3$, projection widths obtained in said respective directions are $xd(\theta_1)$, $xd(\theta_2)$, and $xd(\theta_3)$, which are applied to an expression of $xd(\theta_1)$, $xd(\theta_2)$, and $xd(\theta_3)$, and a value of $\theta$ which are applied to an expression of $xd(\theta)=a\theta+b\theta+c$, and a value of $\theta$ which takes a minimum value or a maximum value in said quadratic curve is selected as said distortion angle.

3. A character recognition unit comprising :

a character recognition means comprising: a frame memory for changing an image signal obtained by horizontally and vertically scanning a character string to be recognized, into binary data changing the binary data into picture elements and storing the picture elements;

address designation means for designating an address of said frame memory, scanning the picture elements stored in said frame memory from said address in a predetermined direction and reading the stored picture elements;

projection pattern extraction means for extracting a projection pattern comprised of a number of picture elements representing said character string of picture elements read out by said address designation means;

projection width extraction means for obtaining a projection width, said projection width comprised of at least one of a number of scanning lines and a width of scanning lines, when a projection value of said projection pattern becomes "0";

distortion angle detection means for gradually changing direction of said scanning lines to obtain a scanning direction as a distortion angle when said projection width becomes a maximum;

means for separating each character data from said character string;

correction means for correcting only one of horizontal direction components and vertical direction components of each of at least one of the character data and dictionary data corresponding to each character;

recognition means for recognizing characters by comparing at least one of the corrected character data and corrected dictionary data with at least one of the non-corrected dictionary data and non-corrected character data; and means for obtaining a distortion angle of said character string such that there are three scanning directions of $\theta_1$, $\theta_2$, and $\theta_3$, projection widths obtained in said respective directions are $xd(\theta_1)$, $xd(\theta_2)$, and $xd(\theta_3)$, which are applied to an expression of $xd(\theta_1)$, $xd(\theta_2)$, and $xd(\theta_3)$, and a value of $\theta$ which are applied to an expression of $xd(\theta)=a\theta+b\theta+c$, and a value of $\theta$ which takes a minimum value or a maximum value in said quadratic curve is selected as said distortion angle.

4. A character recognition unit comprising:

a frame memory for storing variable density data obtained by horizontally and vertically scanning a character string to be recognized;

address designation means for designating an address of said frame memory, scanning the variable density stored in said frame memory from said address in a predetermined direction and reading the stored data;

density accumulation value calculation means for obtaining a density accumulation value which represents said character string of image data read out from said address designation means;

projection width extraction means for obtaining a projection width, said projection width comprised of at least one of a number of scanning lines and a width of scanning lines, when said density accumulation value becomes "0";

distortion angle detection means for gradually changing direction of said scanning lines to obtain a scanning direction as a distortion angle when said projection width becomes a maximum;

means for separating each character data from said character string;

correction means for correcting only one of the horizontal direction components and vertical direction components of each at least one of the character data and dictionary data corresponding to each character;

recognition means for recognizing characters by comparing at least one of the corrected character data and corrected dictionary data with at least one of the non-corrected dictionary data and the non-corrected character data; and means for obtaining a distortion angle of said character string such that there are three scanning directions of $\theta_1$, $\theta_2$, and $\theta_3$, projection widths obtained in said respective directions are $xd(\theta_1)$, $xd(\theta_2)$, and $xd(\theta_3)$, which are applied to an expression of $xd(\theta_1)$, $xd(\theta_2)$, and $xd(\theta_3)$, and a value of $\theta$ which are applied to an expression of $xd(\theta)=a\theta+b\theta+c$, and a value of $\theta$ which takes a minimum value or a maximum value in said quadratic curve is selected as said distortion angle.

5. A character recognition unit comprising:

a frame memory for storing variable density data obtained by horizontally and vertically scanning a character string to be recognized;

address designation means for designating an address of said frame memory, scanning the variable density data stored in said frame memory from said address in a predetermined direction and reading the stored data;

density accumulation value calculation means for obtaining a density accumulation value which represents said character string of image data read out by said address designation means;

projection width extraction means for obtaining a projection width, said projection width comprised of at least one of a number of scanning lines and a width of scanning lines, when said density accumulation value is not "0";

distortion angle detection means for means for gradually changing direction of said scanning lines to obtain a scanning direction as a distortion angle when said projection width becomes a minimum;

means for separating each character data from said character string;

correction means for correcting only one of horizontal direction components and vertical direction components of each of at least one of the character data and dictionary data corresponding to each character;

recognition means for recognizing characters by comparing at least one of the corrected character data and corrected dictionary data with at least one of the non-corrected dictionary data and non-corrected character data;

wherein a background color of characters is given by "0" and said unit further includes means for obtaining a distortion angle of said character string such that there are three scanning directions of $\theta_1$, $\theta_2$, and $\theta_3$, projection widths obtained in said respective directions are $xd(\theta_1)$, $xd(\theta_2)$, and $xd(\theta_3)$, which are applied to an expression of $xd(\theta)=a\theta+b\,\theta+c$, and a value of $\theta$ which takes a minimum value or a maximum value in said quadratic curve is selected as said distortion angle.

* * * * *